United States Patent
Yin et al.

(10) Patent No.: US 8,942,971 B1
(45) Date of Patent: Jan. 27, 2015

(54) AUTOMATED PROJECT LOCALIZATION INTO MULTIPLE LANGUAGES BY USING MACHINE TRANSLATION

(75) Inventors: Jun Yin, Shanghai (CN); Piotr Powalowski, Zielona Gora (PL); Peter Yung Sen Chen, Los Altos, CA (US)

(73) Assignee: Google Inc., Mountain View, CA (US)

( * ) Notice: Subject to any disclaimer, the term of this patent is extended or adjusted under 35 U.S.C. 154(b) by 532 days.

(21) Appl. No.: 13/304,879

(22) Filed: Nov. 28, 2011

(51) Int. Cl.
*G06F 17/28* (2006.01)
(52) U.S. Cl.
USPC .................................. 704/2; 704/8; 704/277
(58) Field of Classification Search
USPC ............... 704/1–10, 251, 255, 257, 277, 270; 715/513, 764
See application file for complete search history.

(56) References Cited

U.S. PATENT DOCUMENTS

| | | | |
|---|---|---|---|
| 2003/0126559 A1* | 7/2003 | Fuhrmann | 715/513 |
| 2006/0100847 A1* | 5/2006 | McEntee et al. | 704/4 |
| 2006/0287844 A1* | 12/2006 | Rich | 704/2 |
| 2009/0037830 A1* | 2/2009 | Kulkarni et al. | 715/764 |

* cited by examiner

*Primary Examiner* — Huyen X. Vo
(74) *Attorney, Agent, or Firm* — Remarck Law Group PLC

(57) ABSTRACT

Applications can be localized by localization experts to allow them to be used by a broader customer base. The localization can be done given resource files containing localization resources. A localization resource may contain a programming component and non-programming component. The non-programming component can be sent to a machine localizer. The machine localizer may provide a plurality of localizations corresponding to a plurality of languages based on the non-programming component of the localization resource. A plurality of localized applications can be complied based on the localized non-programming components and the original programming component.

17 Claims, 4 Drawing Sheets

AUTOMATED PROJECT LOCALIZATION INTO MULTIPLE LANGUAGES BY USING MACHINE TRANSLATION

BACKGROUND

A localization expert can modify an application for numerous reasons, such as to make the application more useful for a larger audience, to make the application more applicable to a different culture, to account for differences in distinct markets, etc. The application may be modified by modifying a resource such as a text string, color and style settings, image and style icon files, sound files, etc. For example, software originally designed for the United States market may generate an error message containing a text string in English if a user clicks a specific button within the software. A localization expert may localize the error message such that a Chinese-speaking user in the Chinese market may be able to understand the localized error message in a similar way that an English-speaking user in the United States market understands the original message. Accordingly, the same or similar software can be used by a larger number of users.

The localization expert may require context data regarding the application to provide a localization. Without sufficient context data, the localization provided by the expert may not be correct for the application as the meaning of the resource to be localized may be ambiguous. For example, if the localization expert is only given a list of the resources to be translated from one language to another, the translation provided by the expert may not accurately reflect the meaning of the original resources. More specifically, if the application contains multiple resources with the phrase "Enter", a localization expert with only a list of the resources to be localized may not be able to distinguish between the "Enter" which requires pressing the Enter Key and "Enter" which grants a user access to a portion of the application.

BRIEF SUMMARY

According to an embodiment of the disclosed subject matter, a message file corresponding to an application may be received, which has a first element that includes a text string to be translated and corresponding metadata that describes how the text string is to be shown in a user interface of the application. A plurality of languages into which at least part of the message file is to be translated are determined. The text string to be translated can be sent to a machine translation system. Language identifiers corresponding to the plurality of languages can be sent to the machine-translation system. A plurality of translations of the text string corresponding to the plurality of languages can be received from the machine-translation system. At least one translation of the text string received from the machine-translation system can be compared to a prior localization of the same text string. The prior localization may be determined to be different than the translation received from the machine-translation. At least one translation of the text string is updated based on the determination. A plurality of second elements, each including a translation of the text string and the metadata corresponding to the first element are generated. The localized message file can be sent to the developer for use in generating a plurality of localized versions of the application.

According to an embodiment of the disclosed subject matter, a resource file corresponding to an application with a first localization resource having a programming component and a non-programming component is received. The non-programming component is sent to a machine localizer. A plurality of localized non-programming components can be received and a plurality of second localization resources based on the localized non-programming components and programming component can be generated. A plurality of target languages may be received and sent to the machine localizer. The machine localizer may localize the non-programming component based on the plurality of target languages. At least one of the plurality of localized non-programming components may be compared to a prior localized non-programming component and may be updated based on the comparison. The programming component may include metadata and/or formatting information such as HTML and/or a variable. A localized application may be generated based on the localized resource file.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 3:
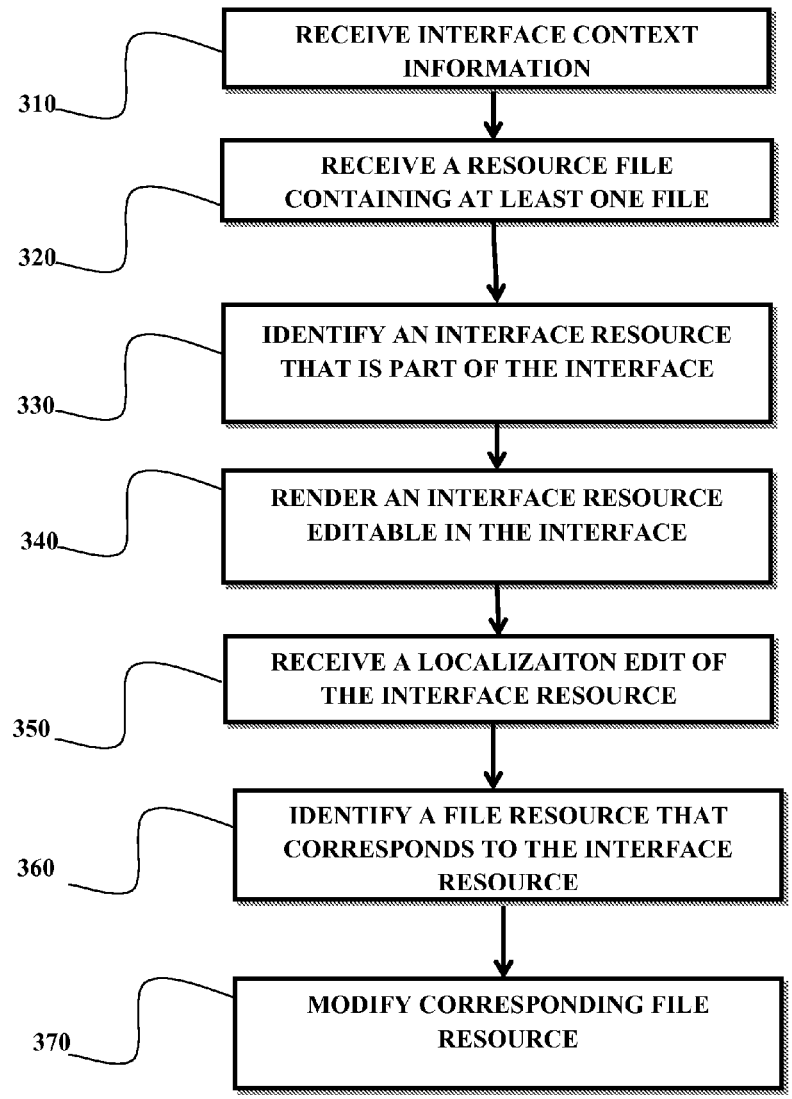
FIG. 3 shows an example process for providing context information to a localization expert according to an embodiment of the disclosed subject matter.

As shown in FIG. 3, according to embodiments of the disclosed subject matter, context information about an interface of an application can be provided to a localization expert. Context information about an interface can include text data, image data, audio data, video data, color and style settings, HTML, XML, a CSS data, layout information, executable or interpreted code, etc., and any other information relating to the content, layout and behavior of all or part of a user interface. The context information may be received at 310. The context information may be based on one or more of a variety of applications, including, but not limited to, web-based applications, mobile applications, desktop applications, a snapshot of an application, etc., or any other applicable application or a combination thereof. The context information may be used to render a localization interface using, at least in part, HyperText Markup Language (HTML), Extensible Markup Language (XML), and the like, and any other information useful in displaying information. The context information also may contain interface resources that may be editable within the interface at 340. Further, the localization interface may be rendered at 320 based at least in part on a resource file containing file resources that are associated with localizable aspects of the application. The file resources may contain a list of pairs that can be used to identify the resource and the content of the resource at 330. The format of the file resources may vary based on the application, localization expert, developer, etc. The format may be based on, but is not limited to, Java properties files, GWT/UI Binder (Java properties including comments for resources), an XML format, etc., or a combination thereof.

For example, a Java properties resource file that corresponds to messages or errors within the application can contain the following code:

project.message.okay=Press okay to continue
    project.message.user=User % s logged out
    project.error.noData=Found only % d data points!

A GWT/UI Binder formatted resource file that corresponds to the same or similar messages or errors within the application can contain the following code:

Shown to user in registration form.
    project.message.okay=Press okay to continue
    # Shown to user on log out event. Placeholder % s shows user name.
    project.message.user=User % s logged out An XML format resource file that corresponds to the same or similar messages or errors within the application can contain the following code:

```
<message>
  <id>project.message.user</id>
  <text>User %s logged out</text>
  <comment>Shown to user on log out event.</comment>
  <placeholders>
    <placeholder>
      <text>%s</text>
      <example>John</example>
      <comment>Placeholder %s shows user
        name.</comment>
    </placeholder>
  </placeholders>
</message>
```

In the examples shown, each of the messages "Press okay to continue," "User % s logged out," and "Found only % d data points" may represent a resource that can be localized. The resources may be obtained from the associated resource files as described herein.

The localization expert may provide a localization edit at 350 by altering an editable portion of the context information that was rendered to the localization expert at 340. The editable portion of the context information can be a localization interface resource. A localization file resource corresponding to the localization interface resource may be identified at 360. A change to context information can be reflected in a change to the corresponding resource in the localization resource file at 370.

Context information that can be used to render a localization interface may be based on a web-based application. The context information can be at least partly generated by activating a browser plugin. The plugin may extract context information from the application and may further extract such information based upon multiple application interface instances (e.g., screen shots) to determine any changes from one or more interface instances to another interface instance. Based on the application interface or changes across interface instances, the plugin may obtain application interface resources. These interface resources may be aspects of the interface that can be made editable by the localization expert in a localization interface. The interface resources may directly correspond to file resources of the application. The interface resources may be obtained by sending a request for a Domain Object Model tree (DOM tree) and Cascading Style Sheet data (CSS) to an application (such as a stand-alone program, an online service, etc.) and detecting interface resources based on the request. For example, regarding Web based applications, the user can install and use a browser plug-in that detects when the page that user is viewing has changed. This can be done by listening to the public notifications and/or detecting the events of all or part of the structure of the page. The events of all or part of the structure of the page can be obtained when the plug-in requests a current DOM tree of the page elements and their CSS styling from the browser. This can contain exactly the interface elements (resources) present (e.g., visible, present but not displayed, etc.) at the moment, including those that may be dynamically created by JavaScript, loaded resources and elements based on retrieved data requests. The plug-in can send all or part of the data to a server for final assembly. The data can include not only HTML and CSS code, but also other resources, such as images and the background used in the page. On the server side, non-interface elements of the DOM tree can be removed and CSS styles can be added as one of the nodes of the DOM tree. The result may be transformed into HTML text or any other suitable form.

Context information based on a mobile application may be generated by extracting embedded text or images from the mobile application. The mobile application may be an application for any mobile technology, including mobile phones (e.g., QWERTY based phones, touchscreen phones, flip based phones, slide based phones, operating systems loaded phones, etc.), tablets (e.g., capable of processing audio-visual data including books, periodicals, movies, music, games, and web content which may be QWERTY based, touch screen based, flip based, etc.) or any other applicable mobile technology. The extraction may be conducted through Optical Character Recognition (OCR) techniques, by reading text in HTML, etc. The implementation may extract location data corresponding to interface resources (e.g., locations at which photographs or videos were taken, stored locations of the mobile platform at the time of a phone call or text message (sent or received), or the like). The location data can be used to allow the localization expert to localize elements of the application by allowing a localization expert to visually see the location of the interface resource.

Some mobile systems allow developers to run their applications on a desktop machine in an emulated mode. These systems grant the emulator program access to the basic structure of presented elements for the purpose of rendering those presented elements. For example, a developer may use the emulator program to visually see a mobile application's home screen on a desktop computer. To capture snapshots of mobile applications, the user can connect the mobile device to a desktop computer and run an application on the mobile device. In accordance with embodiments of the disclosed subject matter, the application can access the interface elements structure and their basic information and retrieve the position (coordinates in mobile screen) for each displayed element and embedded text (if any). It can also retrieve an image and/or snapshot of a widget as an image file, such as a .jpeg or .png file. The retrieved data can be sent to a server and assembled into an HTML structure. The server can create an HTML file for each snapshot taken. For example, each file can have a snapshot of the whole application set as a background, and can contain HTML tags to represent interface elements. As a specific example, for each interface element found in the interface, the application can place a <div> HTML element in an absolute position, according to the coordinates found. The absolute position can be the exact position the interface element is located on the snapshot. Placing a <div> element at the absolute position can avoid incorrectly tagging the interface resource in the event of a resize of the snapshot or the like. For example, the <div> element may be placed based on the coordinates of the message box within the application interface. The coordinates may be based on screen resolution, pixel difference, relative position based on another element, or the like. Based on the <div> element, the system can obtain a snapshot image and textual content from the background and text of the application, respectively. The resulting HTML page can be transformed into an HTML based snapshot. Other techniques for creating and providing the interface elements may be used.

A localization interface based on a snapshot may be generated by extracting context information and application interface resources from an application interface snapshot. For example, the context information and application interface resources may be generated by extracting embedded text or images from within the application interface. The extraction may be conducted through an OCR technique, pattern recognition, file extraction or file copy, or any other applicable extraction technique. Some applications may use "widgets" as interface elements, which can include pre-defined interface features such as buttons, switches, input entries, and the like. For widget detection, sub-parts of a snapshot can be compared with known widget images such as geometric shapes, buttons, switches, windows or other similar widget interface elements. The known widget images can be detected on the snapshots. Based on the detection result, an HTML snapshot can be created. For example, a new HTML page can be created such that the background of the HTML page is based on the application snapshot. For all detected elements (text, widgets, other resources, etc.), absolutely positioned <div> elements can be placed in the page. For example, the HTML background may contain a message box. <Div> elements may be placed around the HTML code corresponding to the text box. The resulting HTML page can be transformed into an HTML based final snapshot. This example is illustrative, and other techniques for generating HTML or snapshots in other formats can be used.

A similar approach can be used for different types of desktop applications that allow programmatic access to the presented interface and/or where an operating system can provide details of presented interfaces. In those cases, a desktop application in accordance with embodiments of the disclosed subject matter can access data of the captured application directly (when possible) or through an emulator. The interface can be recreated as an HTML page based on the data found. The recreated interface can be sent to the server.

Interface resources can be aspects of the application interface that can be edited by a localization expert using a localization interface. For example, an application message that includes the word "Welcome!" may be shown in a localization interface in a context similar or identical to the way it appears in the corresponding application interface. The localization interface may (perhaps unlike the application interface) render this message in such a way as to make it editable by the localization expert, e.g., by modifying "Welcome!" to "Bienvenue!" to help localize an English-based application interface to a French language user base. In this manner, the localization expert can visually see the context in which the interface resource is embedded in the interface, and localize the interface resource accordingly. The localization expert can thus provide a localization edit of the interface resource directly within the provided localization interface. The localization interface can act as a What You See Is What You Get (WYSIWYG) editing facility to localize application interface resources. By preserving context information of the application interface in the localization interface, the localization expert can better determine the appropriate localization edits to accurately convey the best meaning possible to the user in the localized environment.

According to embodiments of the disclosed subject matter, a resource file associated with an application, which contains file resources, may be received. The resource file containing the file resources can be associated with the application such that the resource file is used when compiling the application and may determine, at least in part, what elements are included in the application interface. The application based on the resource file can contain aspects that may be localizable. File resources within the resource file may be associated with the aspects of the application that may be localizable. In some embodiments, each file resource may correspond to a localizable aspect in the application interface. Accordingly, editing a file resource within the resource file can subsequently alter an application when the application is later compiled using the edited (localized) resource file.

A localization file resource can be a file containing localization interface resources and/or references thereto. The localization file resource can be based upon an application file resource provided by, for example, the developer of the application; information extracted from outputs of one or more instances of the application itself, such as from HTML code generated by the application; or resources extracted from one or more snapshots of the application interfaces. In an example process a localization file resource corresponding to a localization interface resource may be identified. The identification may occur before or after rendering a localization interface to a localization expert. This correspondence can be used to relate a localization interface onscreen edit to a resource in the localization resource file. Thus, a change to the onscreen resource can be reflected in a change to the corresponding resource in the localization resource file.

The localization file resource that corresponds to the resource modified onscreen by the localization expert can be identified by comparing the localization resource being modified to resources in the localization file. A match can be made based upon the similarity between the contents of the onscreen resource and the localization file resource. For example, if an onscreen resource originally contained the text string "Hello", then the text string "Hello" may be matched to the localization file resource containing the same or similar text string. Based on the matching, a corresponding localization file recourse can be identified. Once the corresponding localization file resource is identified, it can be modified in accordance with the change made to the onscreen resource by the localization expert. The modified localization resource file can later be used directly or can be used to generate an application resource file that can be compiled or included by the developer with the rest of the application. The result can be a localized application in which the application resources have been modified by the localization expert.

According to some embodiments of the disclosed subject matter, the implementation may identify a localization file resource corresponding to an interface resource by converting the file resource to a regular expression and comparing the regular expression to the interface resource. For example the file resource may be:

"The user % s has % d messages."

A regular expression of the file resource can be:

"The user [^< >]* has [0-9]+ messages."

According to an embodiment of the disclosed subject matter, file resources corresponding to an interface resource may be identified by individually labeling the file resources to create specially augmented default file resources. Labeling the file resources may distinguish a file resource from other file resources within the resource file. The labels may be inserted both in the beginning and the end of a file resource and can accordingly mark the beginning and end of the resource. For example, a file resource may originally be:

"User % s is done"

An augmented version of the file resource can be:

"{U+1234} User % is done {U+1235}."

A corresponding interface and interface resources may be generated based on the augmented default file resources and rendered to a localization expert. The labels may include non-rendered characters that may be detectable by a machine, but not appear to a localization expert in the localization interface. If the localization expert provides a localization edit through the localization interface, the corresponding resource in the localization file resource can be identified based upon comparing the labels around the onscreen resource being edited and the labels around resources in the localization resource file. The corresponding localization file resource may be modified based on the localization edit, and subsequently a localized application may be compiled based upon the modified localization resource file. The implementation can reduce or eliminate improper localizations caused by mismatches by matching the localization edit within the localization interface with the correspondingly labeled resource element in the localization resource file. As an illustrative example, as shown in Table 1, the term "Enter", which represents asking a user to press the enter key, corresponds to the third file resource within the localization resource file. Without any labeling, the second and third file resources may not be differentiable. However, after labeling the resources, each resource is distinguished by the labels assigned to the beginning and end of the resource. Thereafter, the generated interface resources can contain a matching label as shown in Table 1. The interface resource can therefore be matched to the corresponding augmented default file resource.

TABLE 1

| Resource file location | Context | File Resource | Augmented Default File Resource (DAFR) | Interface Resource based on DAFR |
|---|---|---|---|---|
| 1 | Exit page | Exit | {U + 1000} Exit {U + 1001} | {U + 1000 } Exit {U + 1001} |
| 2 | Enter page | Enter | {U + 2000} Enter {U + 2001} | {U + 2000 } Enter {U + 2001} |
| 3 | Press Enter key | Enter | {U + 3000} Enter {U + 3001} | {U + 3000 } Enter {U + 3001} |
| 4 | Agree to terms | Agree | {U + 4000} Agree {U + 4001} | {U + 4000 } Agree {U + 4001} |

A localization of the phrase "Enter" in the application that asks the user to press the Enter Key would be matched only with the corresponding localization resource file resource. Accordingly, a localized version of the phrase "Enter" can be matched with the proper augmented default file resource and the use of that file resource to compile the application can result in a properly localized application.

A localization interface built with captured context information can be made editable in accordance with embodiments of the disclosed subject matter. For example, resources in a snapshot HTML code version of an application interface can be marked with HTML tags containing custom attributes with data describing the resource. When the snapshot is loaded in the application, those marking tags in the snapshot are identified and can be assigned events that will display a localization interface that makes the resource editable by the localization expert. For example, consider two example resources:

test.message.1="Logout"
test.message.2="Hello % s!"

An example original snapshot HTML text contains:

. . . <div>Hello John! <span>Logout</span></div> . . .

The snapshot HTML with markings can be:

. . . <div>
   <span msg="test.message.1">Hello John!</span><span><span
msg="test.message.2">Logout</span></span>
</div> . . .

According to an embodiment of the disclosed subject matter, code can be added to aid in localization:

```
// Load the snapshot to an iframe element
iframe.url = 'http://my.server.com/snapshot?id = 1234'
// after loading find all marked elements:
var snapshotHtml = iframe.getHtmlNode( );
var allSpanElements =
    snapshotHtml.getElementsByTagName('span');
for (var span : allSpanElements) {
    // look for span elements with a 'msg' attribute
    if (span.hasAttribute('msg')) {
        // add event happening when user clicks on the message
        span.onClick(function(e) {
            var messageId = e.target.getAttribute('msg');
            // retrieve data of the message from backend
            var messageData =
                BackendService.getDataForMessage(messageId);
            // Show the pre-existing UI
            // element with details of the message
            TranslationUIElement.getInstance( )
                .show(messageDetails) ;
        });
    }
}
```

Programming data corresponding to a localizable aspect of an original application can remain constant across different localized versions of the application. Accordingly, it may be desirable to preserve the programming data from an original application when compiling multiple localized versions of the original application.

Figure 4:
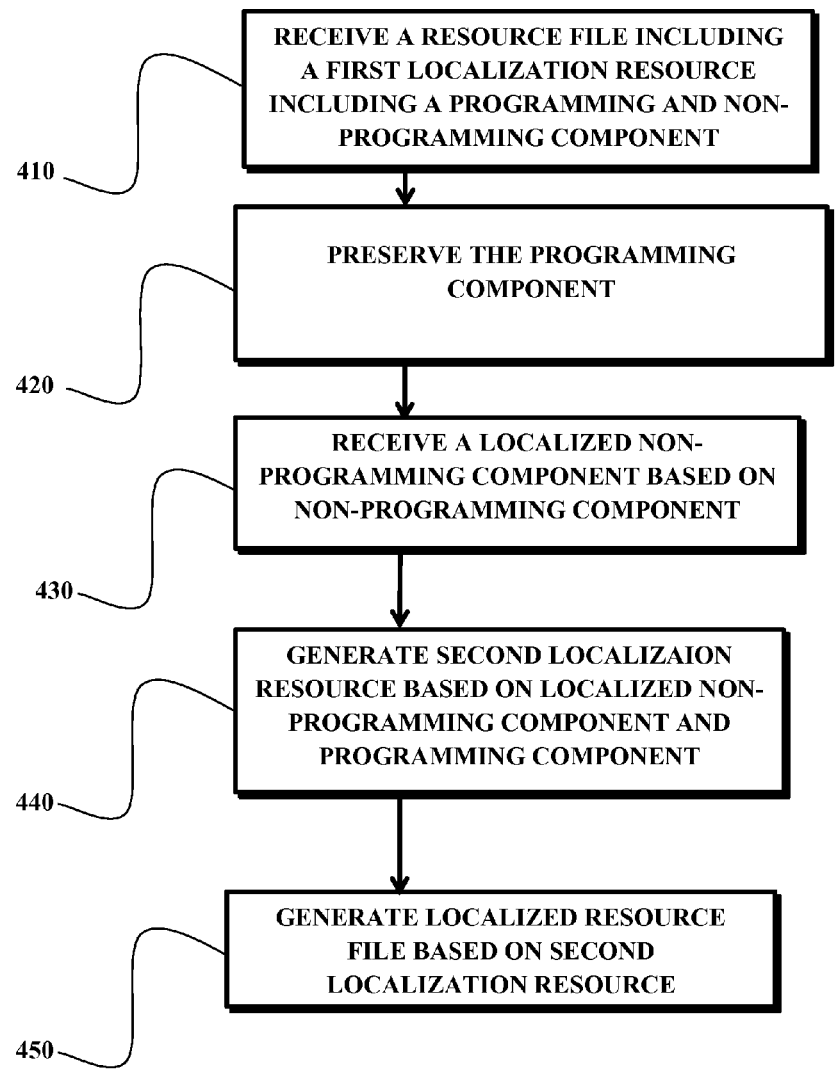
FIG. 4 shows an example process for generating a localized application based on a localization resource with a programming component and a non-programming component.

FIG. 4 shows an example process for localizing an application. As shown at step 410, the system may receive a resource file that includes at least one original localization resource. The original localization resource may contain both programming data and non-programming data. The programming data may include metadata, formatting information, HTML code, variables, or the like or a combination thereof. For example, an original localization resource can include a text string and formatting data that dictates how the text string is rendered within the application. The original localization resource may contain "<b> Hello World! </b>". The text string "Hello World!" corresponds to the non-programming component. The tags "<b>" and "</b>" correspond to the programming component and indicate that the text is displayed in a Bold format. As another example, an original localization resource can include a text string and a variable that represents external data. An original localization resource may contain "Hello % s, how are you today?" The text string "Hello, how are you today?" corresponds to the non-programming component. The variable "% s" corresponds to the programming component and indicates that the application inserts a username for the variable % s.

The system may distinguish between the programming component and the non-programming component within the original localization resource. As shown at 420, the programming component can be a component that remains constant across different localized applications. For example, an original application in English can contain the same programming component as its corresponding localized applications in Spanish or French. Accordingly, the programming component may be preserved in its original state across applications. The non-programming component can be the component that is localizable. As shown at 430, the system can receive localized versions of the non-programming component. For example, an original application in English can contain a non-programming component which may be sent to a machine or human translator to be translated into Spanish or French. The translated non-programming component can be used to compile a localized Spanish or French application. The non-programming component in the localized Spanish or French application is different than the original non-programming English component.

In an illustrative example, the original localization resource may contain "<b> Hello World! </b>". The tags "<b>" and "</b>" may be preserved in their original state such that they may not be modified or sent to a machine or human localizer. The text "Hello World!" may be send to a machine localizer to be localized for one or more locales. The machine localizer may provide multiple localizations based on the non-programming component. For example, the machine localizer may send back 40 different translations of "Hello World!" in 40 different languages (e.g., in Chinese, Hindi, Spanish, French, German, etc.). The 40 different translations can be used to compile 40 different localized versions of the original application.

Some applications may be suitable for localization for a set group of locales, whereas others may be more suitable for localization for locales individually. Accordingly, a number and designation of languages for localization may be predetermined, may be selected by a developer, may be selected by the machine localizer, or in any other appropriate manner. For example, the system may receive a set of target languages from a developer. The non-programming component sent to a machine localizer may be translated to each of the set of target languages. As another example, the system may be configured to store a set of target languages. The non-programming component sent to a machine localizer may be translated to each of the stored set of target languages. As another example, the machine localizer may receive a plurality of language identifiers indicating which languages the machine localizer should localize in, or a single language identifier that is an umbrella identifier for a plurality of languages. As a specific example, a language identifier such as "SET1" may correspond to a subset of languages [Spanish, French, and German]. Accordingly, the machine localizer may provide localizations in Spanish, French, and German when it receives a SET1 language identifier.

The localized non-programming components can be used to compile localized versions of the original application. As shown at 440, additional (second) localization resources may be generated from the original programming component and the localized non-programming components. The original programming component can be paired with a localized non-programming resource such that the original programming attributes can be applied to the localized non-programming resource when the second localization resource is used to compile a localized application, as shown at 450.

Figure 5:
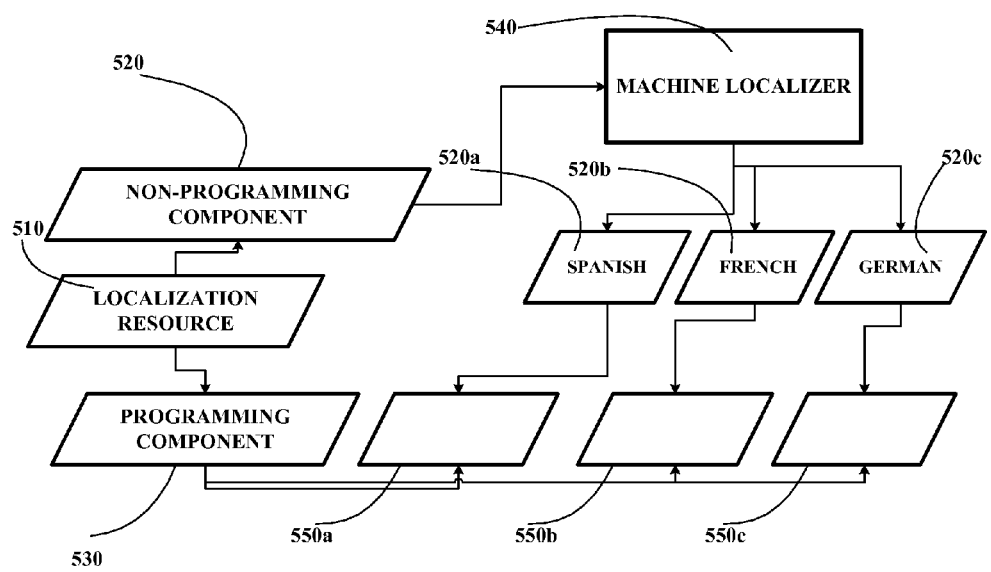
FIG. 5 shows an example arrangement for pairing multiple localized non-programming components with an original programming component.

FIG. 5 shows an illustrative example of localizing an application based on the programming and non-programming components of a localization resource, such as shown in FIG. 4. According to the example, the original localization resource may include "<i> Hello </i>". The text "Hello" is the non-programming component 520. The tags "<i>" and "</i>" are the programming component 530. The non-programming component "Hello" can be sent to the machine localizer, 540. The machine translator can translate the text "Hello" into Spanish ("Hola"), 520a, French ("Bonjour"), 520b, and German ("Hallo"), 520c. The Spanish "Hola" can be paired with the original programming tags "<i>" and "</i>" such that a second localization resource includes "<i> Hola </i>", as shown by 550a. The French "Bonjour" can separately be paired with the original programming tags "<i>" and "</i>" such that a different second localization resource includes "<i> Bonjour </i>" as shown by 550b. The German "Hallo" can separately be paired with the original programming tags "<i>" and "</i>" such that a different second localization resource includes "<i> Hallo </i>" as shown by 550c. The Spanish-, French-, and German-based second localization resources, may be used to generate a Spanish based localization application, a French based localized application and a German based localized application, respectively.

According to embodiments of the disclosed subject matter, a resource file can be used to compile an application. A localized resource file may be generated for a certain locale based on the second localization resource. The localized resource file can contain multiple second localization resources, each corresponding to the same locale. For example, two original localization resources, LR1 and LR2 may include "<i> Hello </i>" and "<b> Bye </b>", respectively. The two non-programming components, "Hello" and "Bye" may be sent to a machine localizer. The machine localizer may provide translations of the two non-programming components in Spanish, TLR1 and TLR2 including "Hola" and "Adios", respectively. Two second localization resources, SLR1 and SLR2, may be generated based on the translated non-programming components and the original programming components by matching translated non-programming components to corresponding programming components. Accordingly, SLR1 and SLR2 can include "<i> Hola </i>" and "<b> Adios </b>", respectively. A resource file may be generated such that the resource file includes at least SLR1 and SLR2. A localized application may be compiled based on the resource file.

In some cases, generated localizations may be used to correct, update, or otherwise modify previous localizations. For example, a localized non-programming component generated by the machine localizer may be compared to a prior localization of the same text string. The prior localization may be generated by a machine or a human localizer. The prior localization may be a known good localization. The comparison may result in determining that the prior localization is either the same, similar, or different than the localization received from the machine localizer. If it is determined that the prior localization is different, the localization received from the machine localizer may be updated. If it is determined that the prior localization is the same or similar to the localization received from the machine localizer, then the localization received from the machine localizer may be accepted as a good localization.

Figure 1:
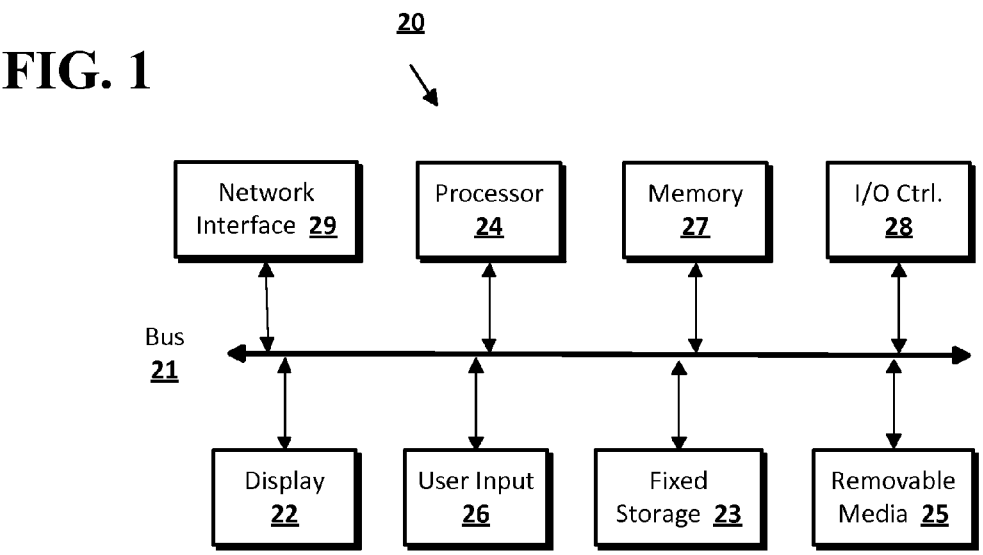
FIG. 1 shows a computer according to an embodiment of the disclosed subject matter.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
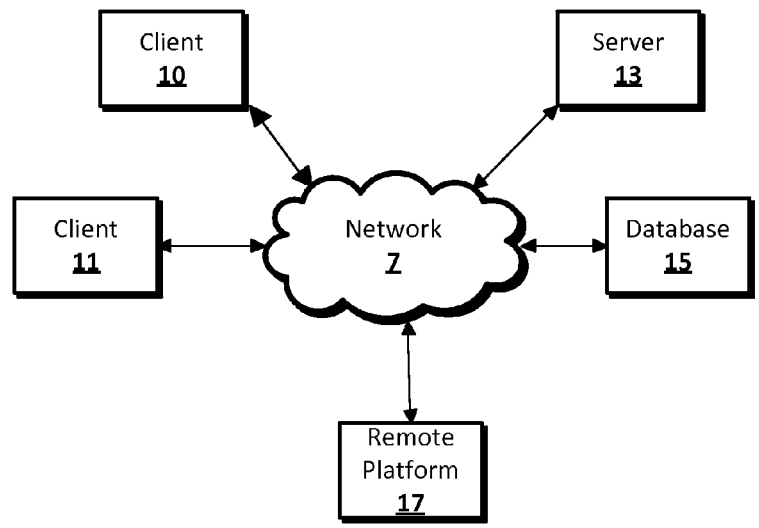
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    receiving, at a computing system having one or more processors, a message file corresponding to an application, the message file comprising a first element that includes a text string to be translated and corresponding metadata that describes how the text string is to be shown in a user interface of the application;
    determining a plurality of languages into which at least part of the message file is to be translated;
    sending the text string to be translated to a machine-translation system;

sending language identifiers corresponding to the plurality of languages to the machine-translation system;

receiving from the machine-translation system a plurality of translations of the text string, the plurality of translations corresponding to the plurality of languages;

comparing, by the computing system, at least one translation of the text string received from the machine-translation system to a prior localization of the same text string;

determining, by the computing system, that the prior localization is different than the translation received from the machine-translation system;

updating the at least one translation of the text string based on the determining that the prior localization is different than the translation received from the machine-translation system;

generating a plurality of second elements, each of which includes a translation of the text string and the metadata corresponding to the first element;

generating a plurality of localized message files based on the plurality of second elements; and sending the localized message files to the developer for use in generating a plurality of localized versions of the application.

2. A method comprising:

receiving, at a computing system having one or more processors, a resource file corresponding to an application, the resource file comprising a first localization resource having a programming component and a non-programming component;

sending the non-programming component to a machine localizer;

receiving a plurality of localized non-programming components;

comparing, by the computing system, at least one of the plurality of localized non-programming components to a prior localized non-programming component;

determining, by the computing system, that the at least one prior localized non-programming component is different than the prior localized non-programming component;

updating the at least one of the plurality of localized non-programming components based on the determining that the at least one prior localized non-programming component is different than the prior localized non-programming component;

generating a plurality of second localization resources based on the localized non-programming components and the programming component; and generating a plurality of localized resource files based on the second localization resources.

3. The method of claim 2, further comprising receiving a plurality of target languages.

4. The method of claim 3, further comprising sending the plurality of target languages to the machine localizer, wherein the machine localizer localizes the non-programming component based on the plurality of target languages.

5. The method of claim 2, wherein the programming component comprises metadata.

6. The method of claim 2, wherein the programming component comprises formatting information.

7. The method of claim 6, wherein the formatting information comprises HTML.

8. The method of claim 2, wherein the programming component comprises a variable.

9. The method of claim 2, further comprising generating a localized application based on the localized resource file.

10. A system comprising:

a database storing a resource file corresponding to an application, the resource file comprising a first localization resource having a programming component and a non-programming component;

a processor in connection with said database, the processor configured to:

send the non-programming component to a machine localizer;

receive a plurality of localized non-programming components;

compare at least one of the plurality of localized non-programming components to a prior localized non-programming component;

determine that the at least one prior localized non-programming component is different than the prior localized non-programming component;

update the at least one of the plurality of localized non-programming components based on the determining that the at least one prior localized non-programming component is different than the prior localized non-programming component;

generate a plurality of second localization resources based on the localized non-programming components and the programming component; and generate a plurality of localized resource files based on the second localization resources.

11. The system of claim 10, further configured to receive a plurality of target languages.

12. The method of claim 11, further configured to send the plurality of target languages to the machine localizer, wherein the machine localizer localizes the non-programming component based on the plurality of target languages.

13. The system of claim 10, wherein the programming component comprises metadata.

14. The system of claim 10, wherein the programming component comprises formatting information.

15. The system of claim 14, wherein the formatting information comprises HTML.

16. The system of claim 10, wherein the programming component comprises a variable.

17. The system of claim 10, further comprising generating a localized application based on the localized resource file.

* * * * *